(12) United States Patent
Calandra et al.

(10) Patent No.: US 7,775,754 B2
(45) Date of Patent: Aug. 17, 2010

(54) TORQUE NUT HAVING AN INJECTION MOLDED BREAKAWAY INSERT

(75) Inventors: Karl Anthony Calandra, Pittsburgh, PA (US); John G. Oldsen, Butler, PA (US); Walter John Simmons, Martinsburg, WV (US); Walter Neal Simmons, Durham, NC (US)

(73) Assignee: FCI Holdings Delaware, Inc., Pittsburgh, PA (US)

( * ) Notice: Subject to any disclaimer, the term of this patent is extended or adjusted under 35 U.S.C. 154(b) by 886 days.

(21) Appl. No.: 11/355,621

(22) Filed: Feb. 16, 2006

(65) Prior Publication Data

US 2006/0210374 A1   Sep. 21, 2006

Related U.S. Application Data

(60) Provisional application No. 60/661,693, filed on Mar. 15, 2005.

(51) Int. Cl.
*F16B 31/00* (2006.01)

(52) U.S. Cl. .......................... 411/5; 411/431; 411/303; 405/259.1

(58) Field of Classification Search .................. 411/5, 411/431, 302–304; 405/258.1, 259.1, 259.2, 405/259.3, 259.4, 259.5, 259.6
See application file for complete search history.

(56) References Cited

U.S. PATENT DOCUMENTS

| | | | |
|---|---|---|---|
| 2,826,222 A | 3/1958 | Case | |
| 4,295,761 A | 10/1981 | Hansen | |
| 4,347,020 A * | 8/1982 | White et al. | 405/259.5 |
| 4,349,299 A | 9/1982 | Eny | |
| 4,386,877 A | 6/1983 | McDowell, Jr. | |
| 4,556,350 A * | 12/1985 | Bernhardt et al. | 405/259.6 |
| 4,704,053 A | 11/1987 | Hipkins, Sr. et al. | |
| 4,708,550 A | 11/1987 | Hamilton | |
| 4,861,197 A * | 8/1989 | Calandra, Jr. | 405/259.3 |
| 4,900,206 A * | 2/1990 | Kazino et al. | 411/377 |
| 4,930,951 A | 6/1990 | Gilliam | |
| 4,958,961 A | 9/1990 | Herbst et al. | |
| 5,064,312 A | 11/1991 | Calandra, Jr. et al. | |
| 5,073,065 A | 12/1991 | Kleineke | |

(Continued)

FOREIGN PATENT DOCUMENTS

CN   1481300 A   3/2004

(Continued)

OTHER PUBLICATIONS

"Sprue" from Wikipedia.org; Mar. 3, 2009.

*Primary Examiner*—Gary Estremsky
(74) *Attorney, Agent, or Firm*—The Webb Law Firm

(57) ABSTRACT

A nut having an injection-molded insert or delay stopper is threaded onto an end of an anchor. A capsule containing a resin component and a catalyst component and the other end of the anchor are positioned in a bore hole in a mine roof, mine wall, side of a hill, concrete wall, or concrete floor. The threaded end of the nut contacts the insert and rotation of the nut rotates the anchor, breaking the capsule and mixing the components. After the components set, increased torque is applied to fracture the insert and move the nut up the threaded end of the shaft against roof stabilizing components on the shaft.

9 Claims, 3 Drawing Sheets

U.S. PATENT DOCUMENTS

| | | |
|---|---|---|
| 5,352,065 A | 10/1994 | Arnall et al. |
| 5,356,255 A | 10/1994 | Takahashi et al. |
| 5,429,466 A | 7/1995 | Nagayama |
| 5,443,332 A | 8/1995 | Hollis |
| 6,296,429 B1 * | 10/2001 | Wright .......................... 411/5 |
| 6,599,059 B2 | 7/2003 | Calandra, Jr. et al. |
| 6,612,783 B2 | 9/2003 | Stankus et al. |
| 6,619,888 B2 | 9/2003 | Calandra, Jr. et al. |

FOREIGN PATENT DOCUMENTS

| | | |
|---|---|---|
| WO | WO96/13368 | 5/1996 |

* cited by examiner

TORQUE NUT HAVING AN INJECTION MOLDED BREAKAWAY INSERT

CROSS REFERENCE TO RELATED APPLICATION

This application claims the benefit of U.S. Provisional Application Ser. No. 60/661,693, filed Mar. 15, 2005.

BACKGROUND OF THE INVENTION

1. Field of the Invention

This invention relates to a torque nut having an injection-molded breakaway insert or delay stopper and to a method of manufacturing the torque nut.

2. Description of the Presently Available Technology

It is well known in the art of mine roof support to tension bolts anchored in bore holes drilled in the mine roof to reinforce the unsupported rock formation above the mine roof surface, e.g., as disclosed in U.S. patent application Ser. No. 11/064,426, filed Feb. 23, 2005, entitled "TRUSS SHOE", which application is hereby incorporated by reference. Conventionally, a bore hole is drilled through the roof into the rock formation. The end of the bolt in the rock formation is anchored by either engagement of an expansion shell on the end of the bolt with the rock formation, or adhesively bonding the bolt by resin to the rock formation, or by utilizing a combination of an expansion shell and resin bonding to secure the roof anchor within the bore hole. Of particular interest in this discussion is the torque nut used to secure an end of the anchor in the mine roof and to secure mine roof stabilizing components on the other end of the anchor.

In general and as discussed in U.S. Pat. No. 5,064,312, which patent is hereby incorporated by reference, the technique of securing the anchor in the bore hole includes inserting a capsule into a bore hole drilled into the mine roof. The capsule contains a resin component and a catalyst component. An end of the anchor is moved into the bore hole to move the end of the anchor into contact with the resin capsule. The anchor is rotated and further moved into the bore hole to fracture the resin capsule and to mix the resin component and the catalyst component together to provide a resin, which will set and harden within the bore hole. After the resin sets, a nut is threaded onto the threaded end of the anchor extending out of the hole to the mine roof stabilizing components, e.g., a bearing plate or truss shoe against the mine roof or wall.

One technique to rotate the anchor to fracture the capsule and/or to mix the resin and catalyst is disclosed in U.S. Pat. No. 4,556,350. In general, a nut has a plug of chemical setting resinous material at an end portion of the nut and is rotated onto the threaded end of the anchor extending out of the hole. Continued rotation of the nut moves the end of the anchor and the plug into contact with one another, after which rotation of the nut rotates the anchor. After the resin hardens to secure the anchor in the bore hole, continued rotation of the nut under increased torque breaks up the plug and the nut can be rotated on the threaded end of the anchor to move the roof stabilizing components against the mine roof.

Although the nut disclosed in U.S. Pat. No. 4,556,350 is acceptable to fracture the capsule and/or to mix the resin and catalyst, there are drawbacks. More particularly, to secure the plug in the nut, the nut has to be degreased to ensure bonding of the plug to the inner surface of the nut to provide consistency of performance of the nut in the field. Further, when forming the resin plug, the nut is desirably placed on a tray treated with a release agent and the desired amount of resin poured into the nut and allowed to cure.

As can be appreciated by those skilled in the art, it would be advantageous to provide a nut having a plug, insert, or delay stopper that does not require the degreasing step, the treatment of the trays with a release agent, and storage of the nuts to cure the resin.

SUMMARY OF THE INVENTION

The invention relates to a nut having a nut body and a breakaway insert or delay stopper. In one non-limiting embodiment of the invention, the torque nut includes a body having a first end and an opposite second end, with a threaded interior passageway connecting the first and second ends of the body, the passageway having internal threads, and an injection-molded breakaway insert is in the passageway, with periphery of the insert engaging apexes of selected ones of the internal threads. The insert is injection molded into the nut body and has its periphery in engagement with threaded interior passageway of the nut body to securely retain the insert in the nut. In one non-limiting embodiment of the invention, one side of the insert has a mark from the sprue as is characteristic of injection-molded parts. In another non-limiting embodiment of the invention, the periphery of the insert is spaced from the nadir of the thread for ease of dropping pieces of the fractured insert out of the nut. In still another non-limiting embodiment of the invention, a non-friction or low-friction material, e.g. but not limiting to the invention, oil or grease, is provided between the insert and the engaged surface portions of the threads for reduced friction between the bolt and nut and for more complete release of the insert from the nut.

The invention further relates to a method of making the non-limiting embodiments of the torque nut of the invention. In one non-limiting embodiment of the invention, an upper die is moved into one end of the nut body and an injection die into the other end. The ends of the dies are spaced to provide a cavity to receive the injected polymer. In one non-limiting embodiment of the invention, the initial polymer entering the cavity forms a thin cover or flash over the upper die surface to prevent the polymer from moving between the threads and the walls of the upper die. After the polymer in the cavity solidifies, the dies are moved out of the nut body to provide the nut having the breakaway insert. In another non-limiting embodiment of the invention, oil or grease is moved through a passageway in the upper die to apply a layer of oil or grease to selected surface portions of threads. In another non-limiting embodiment of the invention, the heat of the injected polymer melts the grease for ease of flowing the grease through the passageway.

In another non-limiting embodiment of the invention, the method relates to making a torque nut having a breakaway insert and includes, among other things, the steps of providing a nut body having a first end and an opposite second end, with an internally-threaded passageway connecting the first end and the second end of the nut body; providing an end of an upper die in the first end of the nut body; providing an end of an injection die in the second end of the nut body, with the ends of the upper die and the injection die spaced a predetermined distance from one another to provide a cavity; moving an injection molding material into the cavity to form a thin cover over surface portions of the end of the upper die to prevent the injection molding material from moving between the threads of the passageway and adjacent walls of the upper die; and moving the dies out of the nut body to provide the torque nut having a breakaway insert.

Still further, the invention relates to a method of securing an anchor to a structure, e.g. and not limiting to the invention, a mine roof, a mine wall, a side of a cliff, e.g., a rock formation adjacent a roadway and a concrete wall. In one non-limiting embodiment of a securing method of the invention, the nut of the invention having the injection-molded breakaway insert is threaded onto an end of a tension bolt. The remaining portion of the bolt is in a bore hole drilled in the structure, with the opposite end of the bolt engaging a capsule having a resin component and a catalyst component. The nut is rotated to rotate the bolt to fracture the capsule and/or to mix the resin and catalyst components to secure the end of the bolt in the bore hole. Continued rotation of the nut under increased torque fractures the insert and moves the nut up the end of the shaft to bias and/or secure roof stabilizing components against the structure. As the nut moves up the end of the shaft, the end of the shaft moves out any portion of the insert remaining in the nut body.

In another non-limiting embodiment of the method of securing an anchor in a structure, the method includes, among other things, the steps of providing a torque nut comprising a nut body having a breakaway insert injection molded into the nut body; threading an end of an anchor into an end of the nut body; positioning opposite end of the anchor in a bore hole drilled in the structure, with the opposite end of the anchor engaging a capsule having a resin component and a catalyst component; and rotating the anchor to fracture the capsule and/or to mix the resin and catalyst components to secure the opposite end of the anchor in the bore hole.

DETAILED DESCRIPTION OF THE INVENTION

Figure 1:
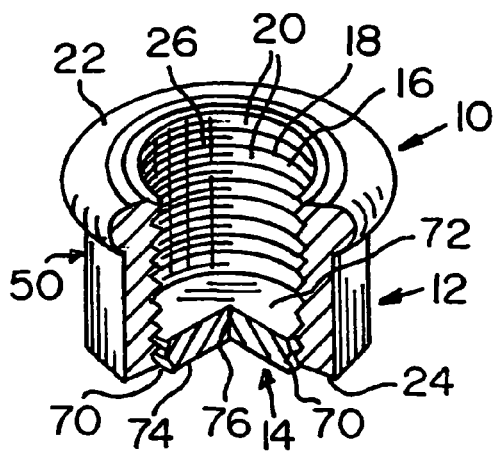
FIG. 1 is an orthogonal view, having portions removed for purposes of clarity, of a non-limiting nut of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

Figure 2:
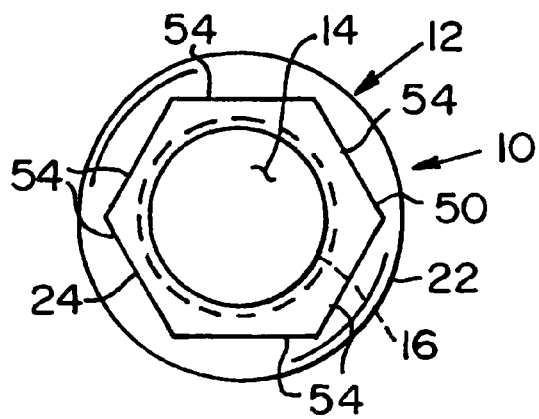
FIG. 2 is an end view of the nut shown in FIG. 1.
Figure 3:
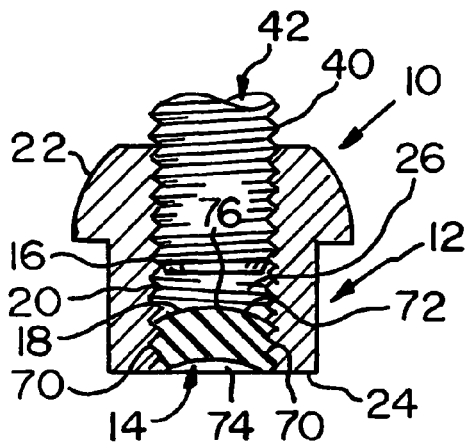
FIG. 3 is a cross-sectional side view of the nut shown in FIG. 1 threaded onto the end of a threaded shaft.

With reference to FIGS. 1-3, there is shown a nut 10 incorporating features of one non-limiting embodiment of the invention. The nut 10 includes a nut body 12 and an injection-molded insert or delay plug 14 captured in the nut body 12 in a manner discussed below. With particular reference to FIGS. 1 and 3, the nut body 12 has internal threads 16 having a substantially uniform thread height and pitch. The term "thread height" is defined as a measured distance between the minor inner thread diameter, e.g., highest point or apex 18, of the threads 16 and the maximum inner thread diameter, e.g., the corresponding lowest point or nadir 20, of the threads 16. The term "pitch" as defined herein is the spacing between apexes 18 of adjacent threads 16.

The internal threads 16 extend from flanged open end 22 to opposite open end 24 to provide the nut body 12 with an internally-threaded passageway 26. The threads 16 shown in FIGS. 1 and 3 extend the length of the passageway 26, i.e., from the end 22 to the end 24. As can be appreciated, the invention contemplates having the threads 16 on only a portion of the internal passageway, e.g., starting a spaced distance from one or both of the ends 22, 24 of the nut body 12. More particularly and not limiting to the invention, nut 27 shown in FIG. 4 has internal passageway 28 having a threaded portion 30 extending from an open end 29 and ending a spaced distance from the end 24 to provide an unthreaded portion 32. The unthreaded portion 32 of the passageway 28 has a diameter equal to or greater than the diameter of the maximum inner threads or nadir 20 to pass threaded end 40 of threaded shaft 42 shown in FIG. 3.

Figure 4:
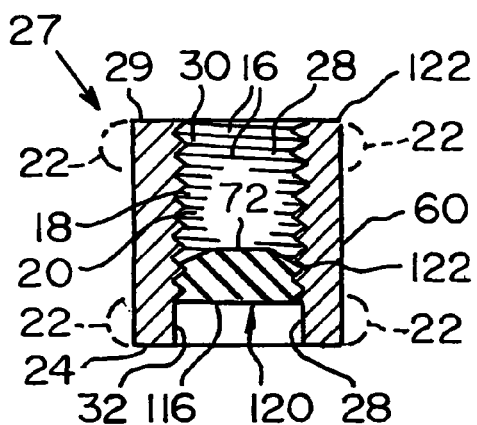
FIG. 4 is a cross-sectional side view of another non-limiting embodiment of a nut of the invention.

Referring back to FIGS. 1 and 3, the configuration of outer surface of the nut body 12 is not limiting to the invention and preferably has a contoured or shaped outer surface that can be engaged, e.g., by a wrench and/or ratchet, to rotate the nut 10 onto the threaded end 40 of the shaft 42 (see FIG. 3) to apply a predetermined torque to the nut 10 to fracture the insert 14 in a manner discussed below. In the non-limiting embodiment of the invention shown in FIGS. 1 and 2, outer body portion 50 of the nut 10 between the flanged end 22 and the end 24 has six flat sides 54 (clearly shown in FIG. 2). As can be appreciated, the invention is not limited thereto and the outer body portion of a nut body incorporating features of the invention can have any number of sides 54, e.g. and not limiting to the invention, more or less than six, and/or the corners between adjacent ones of the sides 54 can be square or rounded corners. The flat side(s) 54 facilitate rotating the nut 10 to apply a predetermined torque; the invention, however, is not limited thereto and contemplates the outer body portion of the nut 10 being circular and having one or more grooves 60 (only one groove shown in FIG. 4) to provide an engaging surface to rotate a nut of the invention. Further, as can be appreciated, each end of the nut body 12 can have a flanged end 22 as shown in phantom for the nut 27 shown in FIG. 4 to capture the torque apply tool between the flanged ends 22 or can have a uniform outer surface extending from one end, e.g., end 29, of the nut body to the opposite end, e.g., end 24, of the nut 27 as shown in FIG. 4.

The material of the nut body 12 is not limiting to the invention and is usually made of metal, e.g., steel, to provide the required physical properties. For more detailed specifications on the physical properties of nuts used on ends of anchors in a mine shaft, reference can be had to ASTM F432.

With reference to FIGS. 1 and 3, the discussion will be directed to non-limiting embodiments of the insert or delay plug 14 of the invention. The insert 14 shown in FIGS. 1 and 3 has periphery 70 captured in the threads 16, an upper convex major surface 72 facing the flanged end 22 of the nut body 12, and an opposite lower concave major surface 74 facing the end 24 of the nut body 12. The upper convex major surface 72 has an elevated radius center portion 76 with non-uniform incrementally increasing diameter as the distance from the center portion 76 increases to provide the convex major surface 72 with a half-spherical elevated surface. Although not limiting to the invention, opposite lower concave surface 74 is generally parallel to the surface 72, e.g., the surface 74 has a half-spherical depressed surface.

Figure 5:
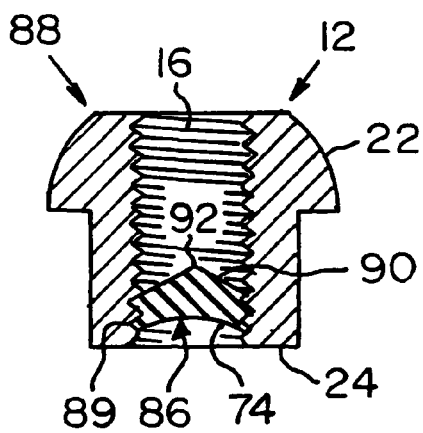
FIG. 5 is a view similar to the view of FIG. 4 showing still another non-limiting embodiment of a nut of the invention.

Insert or delay plug 86 of nut 88 shown in FIG. 5 has periphery 89 secured to the internal threads 16, an upper convex major surface 90 facing the flanged end 22 of the nut body 12, and the lower concave major surface 74 having the half-spherical depressed surface facing the end 24 of the nut body 12. The upper convex major surface 90 has an elevated center point 92 with a uniformly incrementally increasing diameter as the distance from the center portion 92 increases to provide the upper convex major surface 90 with an elevated cone-shaped major surface as shown in FIG. 5.

Figure 6:
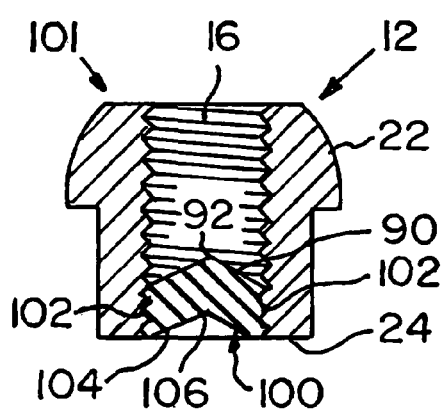
FIG. 6 is a view similar to the view of FIG. 4 showing a further non-limiting embodiment of a nut of the invention.

Insert or delay plug 100 of nut 101 shown in FIG. 6 has periphery 102 secured to the internal threads 16, the upper convex major surface 90 having the elevated cone-shaped major surface facing the flanged end 22 of the nut body 12, and an opposite concave major surface 104 facing the end 24 of the nut body 12. The lower concave major surface 104 has a depressed center point 106 with a uniformly incrementally increasing diameter as the distance from the center point 106 increases. In one non-limiting embodiment of the invention, the lower concave major surface 104 is generally parallel to the upper convex major surface 90 of the insert 100.

Figure 7:
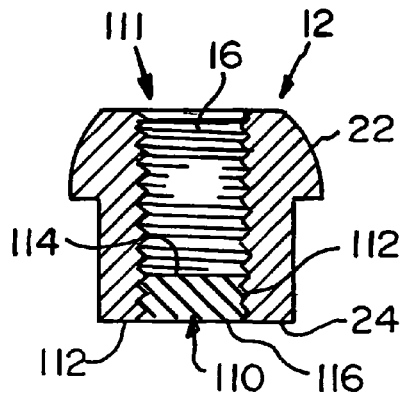
FIG. 7 is a view similar to the view of FIG. 4 showing a still further non-limiting embodiment of a nut of the invention.

Insert or delay plug 110 of nut 111 shown in FIG. 7 has periphery 112 secured to the internal threads 16 of the nut body 12, a flat upper major surface 114 facing the flanged end 22 of the nut body 12, and an opposite lower flat major surface 116 facing the end 24 of the nut body 12. Although not limiting to the invention, the major surfaces 114 and 116 are generally parallel to one another to provide the insert 110 with a disc or hockey puck configuration.

Figure 8:
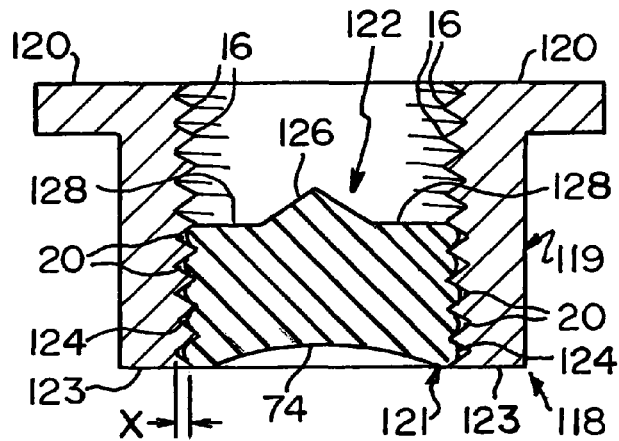
FIG. 8 is a view similar to the view of FIG. 4 showing another non-limiting embodiment of a nut of the invention.

Insert or delay plug 120 of the nut 27 shown in FIG. 4 has periphery 122 secured to the internal threads 16, the upper concave major surface 72 facing the end 29 of the nut body 12, and the lower flat surface 116 facing the end 24 of the nut body 12 of the nut 27. As can be appreciated, the invention is not limited to the shape of the surface of the insert facing an end of the nut body 12, e.g. and not limiting to the invention, the lower surface of the insert facing the end 24 of the nut body and opposite upper surface of the insert can have a combination of the insert surfaces shown in FIGS. 3-7. For example, the non-limiting embodiment of nut 118 shown in FIG. 8 has a nut body 119 having the threads 16, a flange 120, and insert 121. The insert 121 has an upper surface 122 facing the flanged end 120, the lower major surface 74 having the half-spherical depressed surface facing an end 123 of the nut body 119, and a periphery 124 between the threads 16 and spaced from the maximum diameter of the threads, or nadir 20 of the threads for reasons discussed below. The upper major surface 122 has a center elevated cone-shaped portion 126 similar to the upper major surface 90 shown in FIG. 5 surrounded by flat surface portions 128 similar to the flat upper surface 114 shown in FIG. 7.

In the practice of the invention, it is preferred to minimize the outer diameter contact surface area between the end 40 of the shaft 42 and the outer diameter surface of the insert or delay plug to reduce applied reaction torque on the insert while rotating the nut body 12. The applied reaction torque on the insert results from the friction realized from the outer diameter surface contact between the end of the shaft and the contacted surface of the insert. This will minimize a rotational unscrewing motion of the insert from the nut. A more nearly vertical force will be generated from the end of the shaft onto the central portion of the insert surface generating a shear action on the formed threads of the insert. Additionally, the upper concave surface results in an arch reaction from the force applied by the end of the shaft to the insert which generates a normal force into the threads, thus locking the insert into the threads and again disposing the insert breakout to be a shear action on the formed threads.

The inserts of the invention are injection molded into the threads of the nut body in a manner discussed below. The periphery of the insert is captured in the threads by the irregularities in the physical dimensions of the threads associated with machining the nuts and the machining oil having metal debris left on and/or between the threads. Because the inserts are captured in the threads, the inserts are not screwed out of the thread nut but are sheared at the threads fracturing the insert, after which the pieces fall out of the nut body. More particularly and not limiting to the invention, a torque force is applied to the nut as it is threaded onto the threaded end of the anchor causing the threaded end of the anchor to fracture the insert, with the fractured pieces falling out of the nut body. Since force is required to facture the inserts, the shape of the inserts has to be taken into consideration. For example and not limiting to the invention, and as is appreciated by those skilled in the art, the half-spherical major surfaces 72 and 74 of the insert 14 shown in FIG. 3 provides a stronger surface than the flat surfaces 114 and 116 of the insert 110 shown in FIG. 7. Therefore, for inserts 14 and 110 of the same thickness, more torque force is required to fracture the insert 14 than the insert 110. Further, the insert 14 is stronger than the insert 100 having the cone-shaped major surfaces 90 and 104, and the insert 100 is stronger than the insert 110. Therefore for inserts 14, 100, and 110 having the same thickness, more shear torque force is required to fracture the insert 100 than the insert 110. From the foregoing, those skilled in the art can determine the strength of inserts having different major surfaces, e.g. but not limiting to the invention, the insert 86 shown in FIG. 5.

As is appreciated, the invention is not limited to the embodiments of the inserts discussed above and other shapes of inserts can be used in the practice of the invention.

In the prior art, e.g., U.S. Pat. No. 4,556,350 discussed above, the threads are cleaned to remove any machining oil and/or debris between the threads and the nuts placed on a tray treated with a release agent. Resin is poured into the nut body and left on the tray overnight to cure. In the preferred practice of the invention, the insert is injection molded into the nut body and the nut is ready for use within a fraction of an hour, e.g. but not limiting to the invention, within less than 15 minutes, 5 minutes, or 1 minute. As can be appreciated, thermoplastic materials used in the injection molding process cool in less than a minute, therefore, the time to make and use the nuts of the invention is limited to the cycle time of the equipment and cooling time to handle the nuts. In addition to the short time to make the nuts of the invention, the injection molding of the insert in the nut body is preferred because the threads do not have to be cleaned. More particularly, the periphery of the injected insert is maintained in position in the threads by the minor irregularities of the threads 16 as the threads are machined and, further, the space between the threads 16 does not have to be cleaned. To the contrary, any debris between the threads, e.g. but not limiting the invention thereto, machining oil having metal particles on the threads, provides friction between the threads and the periphery of the insert to secure the insert in position in the nut body.

Figure 9A:
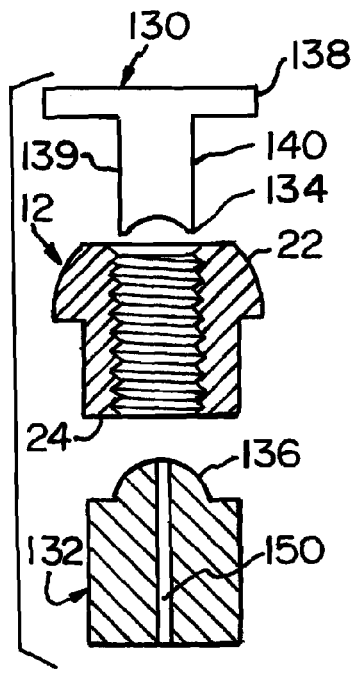
FIGS. 9A-9F show a non-limiting embodiment of the invention to injection mold an insert or delay stopper in a nut body.
Figure 9B:
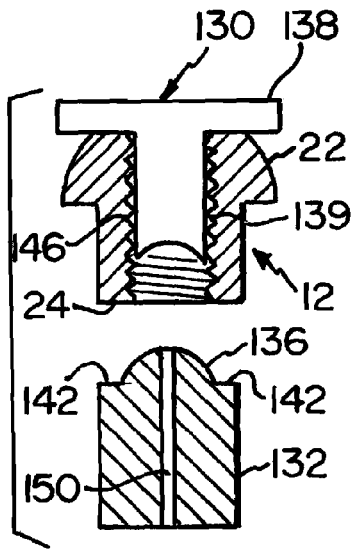
Figure 9C:
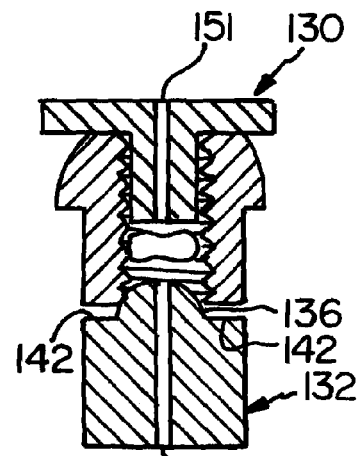

With reference to FIGS. 9A-9C, the discussion is directed to fabricating the nut 88 shown in FIG. 5. As is appreciated, the following discussion is applicable to fabricating a nut having an insert of any shape, e.g. but not limiting, to the nuts 10, 27, 101, 111, and 118 of FIGS. 3, 4, and 6-8, respectively. In FIG. 9A, the nut body 12 is held in position in any convenient manner between forming die 130 and injection die or needle 132. End 134 of the forming die 130 is contoured to provide the surface 90 of the insert 86 shown in FIG. 5 and the injection die 132 has injection end 136 contoured to provide the surface 74 of the insert 86. The die 130 is inserted into the flanged end 22 of the nut body 12 with transverse member 138 resting on the flanged end 22 of the nut body 12 to set the end of the die 130 a predetermined distance from the end 24 of the nut body 12 as shown in FIG. 9B. Although not limiting to the invention, the outside diameter of shaft 140 of the forming die 130 is in the range of equal to or 90% of the diameter of the passageway 26 as measured at the apex 18 of the threads 16. A fit between a shaft 140 of the forming die 130 and the passageway of the nut body 12 prevents material injected into the cavity mold from moving up the passageway 26 between the threads 16 and the shaft 140 of the upper die 130 and depositing on the threads above the insert. As is now appreciated, material on the threads above the insert can require an increase in torque force to move, e.g., screw, the end of the threaded shaft of the anchor into engagement with the insert and/or to fracture the insert. If the required torque is too high, the resin holding the anchor in the bore hole can be weakened. In addition, the flowing of the resin between the threads 16 and the shaft 140 of the upper die can result in the formation of a thin layer of flash that forms a seal preventing the flow of polymer into the threads.

In another non-limiting embodiment of the invention, the die 130 is at a temperature less than the temperature of the resin injected into the cavity. In this manner, as the polymer contacts the contoured end 134 of the die 130, a thin layer or flash is formed over the end of the die 130 in the nut body 12 to prevent flowing of the polymer between the threads 16 of the nut body 12 and outer surface 139 of the shaft 140 of the die 130.

With reference to FIG. 9C, the shaped end 136 of the lower forming die is moved into the end 24 of the nut body 12. As shown in FIG. 9C, the shaped end 136 of the die 130 is greater than the inside diameter of the nut body 12 and only a portion of the shaped end 136 moves into the end 24 of the nut body 12 a spaced distance from the end 134 of the forming die 130 to provide a cavity having a depth to provide the desired thickness of the insert 86. As can be appreciated, for nut bodies having larger inside diameter passageways, the complete shaped end 136 of the injection die would move into the end 24 of the nut body with shoulder 142 of the injection die 132, engaging the end 24 of the nut body 12. With this arrangement, the injection die 132 can be used for a range of inside diameters of passageways of nut bodies.

Figure 9D:
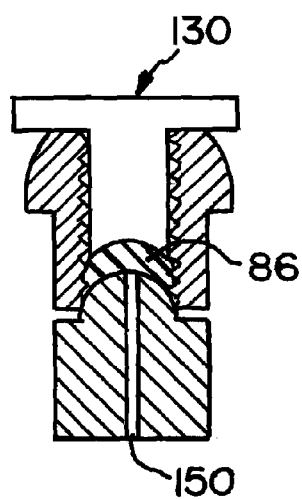
Figure 9E:
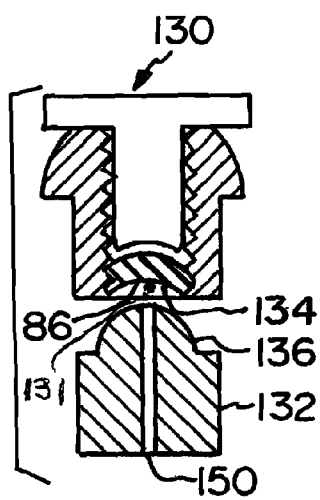
Figure 9F:
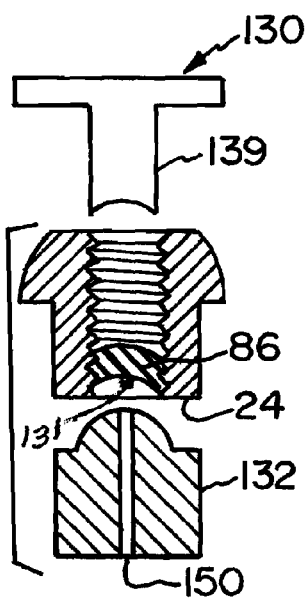

With continued reference to FIG. 9C, pressure is applied in any convenient manner to maintain the upper and lower dies 130 and 132 in position relative to one another in the nut body 12. With reference now to FIG. 9D, polymer is moved through passageway 150 of the injection needle and injected into the space between the upper and lower dies. After the polymer sets, the lower die 132 is moved away from the end 24 of the nut body 12 (see FIG. 9E) and the upper die 130 is moved out of the nut body 12 (see FIG. 9F) leaving the molded insert 86 in the nut body 12 of the nut. To prevent sticking of the dies to the formed insert, mold release material can be provided on the ends 134 and 136 of the dies 130 and 132, respectively. In one non-limiting embodiment of the invention, one side of the insert, e.g. the concave side of the insert 86 shown in FIGS. 9E and 9F has a mark 131 from the sprue as is characteristic of injection-molded parts.

In a non-limiting embodiment of the invention, a low friction material, e.g. but not limiting to, oil or grease, is moved through the dies 130 during the molding process to flow the low friction material over the threads. More particularly, grease is moved through a passageway 151 (shown only in FIG. 9C) in the upper die 130 into the cavity between the lower and upper dies 130 and 132. The heat from the polymer heats the upper die and the grease, reducing the viscosity of the grease flowing through the passageway 151 onto the threads toward the injection die 132. The polymer injected between the dies 130 and 132 contains the layer of grease in the upper threaded portion of the nut body. In this manner, when the insert fractures, the pieces of the insert on the thread more readily fall away from the threads. The invention is not limited to the spaced distance of the periphery and the nadir of the threads. In the non-limiting embodiment of the invention shown in FIGS. 3-7, the periphery of the inserts is adjacent to the nadir of the threads. In the non-limiting embodiment of the invention shown in FIG. 8, the periphery 124 is spaced from the nadir 20 of the threads 16. It has been determined that the insert more readily falls out when the periphery is spaced from the nadir rather than in contact with the nadir 20 of the threads. Although both non-limiting embodiments are acceptable to practice the invention, in the preferred practice of the invention the periphery is spaced from the nadir. It has been determined that as the distance of the periphery from the nadir 20 increases, the residual torque after the plug shears out of the nut body decreases. In the practice of the invention, although not limiting thereto, the distance between the periphery of the insert and the nadir of the thread (designated by the letter "X" in FIG. 8) is in the range of greater than 0 to 25% of the thread height, preferably in the range of greater than 0 to 20% of the thread height, and, more preferably, in the range of greater than 0 to 15% of the thread height. In a non-limiting embodiment of the invention for a ¾ inch nut, the spaced distance between the periphery of the insert and the nadir of the threads is in the range of 0.005 to 0.100 inch.

The rate of injection of the polymer into the cavity between the dies 130 and 132 is not limiting to the invention. It has been observed, however, that a fast injection of the polymer, e.g., 1 to 3 seconds, into the cavity between the dies 130 and 132 fills more of the cavity, e.g., reduces the distance between the periphery of the insert and the nadir of the threads than a slow injection of the polymer, e.g., 6 to 20 seconds into the cavity between the dies 130 and 132. Further, it has been observed that slow injection at high pressure, e.g. but not limiting to the invention, 1,000 to 10,000 PSIG, provides intimate contact with apex of the threads but, as the polymer slowly moves between the threads, the thread root cooling prevents the polymer from completely filling the root. On the other hand, with fast injection, the root can be completely filled.

Polymer materials that can be used in the practice of the invention include but are not limited to any thermoset or thermoplastic material including but not limited to polycarbonate, polystyrene, PMMA, polyolefin, phenolics, polyamides, polyamide-imides, polyesters, polyvinylchlorides, urea formaldehyde, melamine formaldehyde, and combinations thereof but not limited thereto are discussed below.

As can be appreciated, the art of injection molding is well known and a discussion in more detail than the discussion presented above to understand and practice the invention is not deemed necessary.

The invention is not limited to the manner in which a nut is installed on the threaded end of an anchor or the type of anchor that is to be secured to the mine roof. As can be appreciated, any of the non-limiting embodiments of the insert of the invention, unless indicated otherwise, can be installed in the following manner. In one non-limiting embodiment of the invention, a nut is installed in a mine roof support system using the anchor shown in FIG. 6 of, and described in, U.S. Pat. No. 6,619,888, which patent is hereby incorporated by reference.

Figure 10:
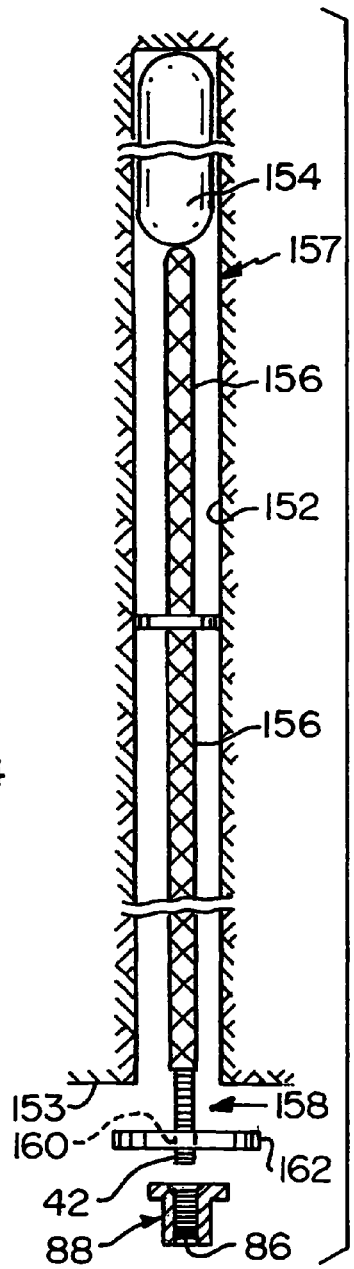
FIG. 10 is a partial cross-sectional view of a mine roof having an end of an anchor and capsule mounted in a bore hole in a mine roof, and a roof stabilizing component on, and a nut of the invention spaced from, the threaded other end of the anchor.

With reference to FIG. 10, bore hole 152 is created in earth and rock in a roof 153 of a mine. The bore hole 152 is particularly adapted to receiving a resin/catalyst cartridge 154 and a mine roof bolt or anchor 156, e.g., a rebar having a threaded end. The resin/catalyst 154, usually a cartridge that includes both a resin and a catalyst, is inserted into the bore hole 152 defined by the mine roof 153 and, thereafter, end 157 of the mine roof bolt 156 is inserted into the bore hole 152. A threaded end 158 of the mine roof bolt 156 extends out of the bore hole 152. Orifice 160 defined by a bearing plate or truss shoe 162 of the type used in the art is placed on the threaded end and the nut 88 rotated onto the end 158 of the bolt 156.

The nut 88 is rotated until the insert or delay stopper 86 of the nut 88 engages the end 158 of the bolt 156, causing the mine roof bolt 156 to rotate in the bore hole 152, moving the end 157 of the bolt 156 into contact with and rupturing the cartridge having the resin/catalyst 154. Continued rotation of the shaft rotates the bolt 156 to mix the resin/catalyst 154 to form an adhesive or grout. As the adhesive/grout cures, the rotation of the nut 88 and mine roof bolt 156 can no longer continue with the uniform torque previously applied. As the nut 88 is rotated further around the now stationary mine roof bolt 156, the end of the shaft applies force to the insert 86, causing the insert 86 to fracture and fall from the end 24 of the nut body 12. The externally-threaded end 158 of the mine roof bolt 156 then continues through the end 24 of the nut body 12 of the nut 88, allowing the nut 88 to advance along a length of the mine roof bolt 156. In this manner, the nut 88 can be further threaded snugly against a bearing plate 162 to tension the bearing plate 162 against the mine roof 153.

As can be appreciated, the invention is not limited to the type of bearing plate or system that is secured to the mine roof by the nut of the invention.

The resin used to make the insert of the invention is not limiting to the invention and the material and configuration of the insert or delay plug is selected to provide adequate break out torque, i.e., sufficient to mix the resin/catalyst and fracture the insert when the adhesive/grout cures without weakening the bond of the grout between the bore wall and the anchor. It has been determined that an insert that fractures when a torque in the range of 30 to 250 foot pounds is sufficient to fracture the resin/catalyst cartridge, mix the resin and catalyst, and fracture the insert without damaging the bond of the adhesive or grout.

In one non-limiting embodiment of the invention, the nut 10 includes a nut body 12, which is a ¾ inch×10 threads per inch TPI flange nut, and the insert or delay plug 14. The delay plug has a thickness of ⅜ inch as measured between the surfaces 72 and 74 and is made of polycarbonate. The delay plug is injection molded in the passageway of the nut body 12 using the injection method described above and illustrated in FIGS. 9A-9F.

The invention is not limited to an insert made of polycarbonate and other materials discussed above can be used.

Figure 11:
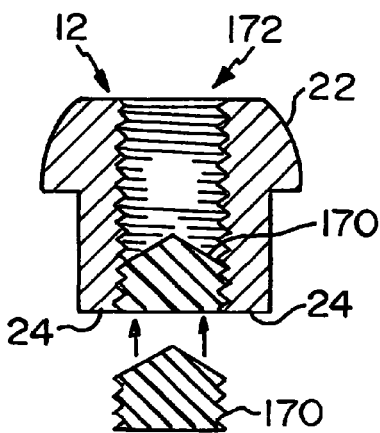
FIG. 11 is a view similar to the view of FIG. 4 showing another non-limiting embodiment of a nut of the invention.

As can now be appreciated, the invention is not limited to injection molding the insert or delay plug in the nut body. More particularly and as shown in FIG. 11, insert 170 can be formed by injection molding a polymer into a cavity formed by die halves (not shown), remove the formed insert from the mold, and screw the insert into the end 24 of a nut body 12 to provide the nut 172.

While specific embodiments of the invention have been described in detail, it will be appreciated by those skilled in the art that various modifications and alternatives to those details can be developed in light of the overall teachings of the disclosure. For example and not limiting to the invention, the anchor or bolt can be mounted in a mine roof or a concrete floor or wall. Further, the presently preferred embodiments described herein are meant to be illustrative only and not limiting as to the scope of the invention, which is to be given the full breadth of the appended claims and any and all equivalents thereof.

What is claimed is:

1. A torque nut, comprising:
   a body having a first end and an opposite second end, and a threaded interior passageway connecting the first and second ends of the body;
   a layer of a material selected from the group of a non-friction material, a low friction material, and combinations thereof covering selected ones of the internal threads, and
   an injection-molded breakaway insert in the passageway, the insert having a first major surface, an opposite second major surface and a periphery, with the periphery of the insert engaging apexes of the selected ones of the internal threads having the layer of a material selected from the group of a non-friction material, a low friction material, and combinations thereof, wherein the layer of a material selected from the group of a non-friction material, a low friction material, and combinations thereof is between the selected ones of the internal threads and the periphery of the insert.

2. The torque nut of claim 1, wherein a surface of the insert has a mark from sprue as is characteristic of injection-molded parts and the insert is threadably mounted in the passageway.

3. The torque nut of claim 1, wherein the insert is spaced from the first end of the body, and the first end of the body further comprises a flange.

4. The torque nut of claim 1, wherein the first major surface faces the first end of the body and the first surface of the insert has a shape selected from the group of a convex surface, a rounded convex surface, a cone-shaped convex surface, a flat surface, and combinations thereof.

5. The torque nut of claim 1, further comprising one end of a mine roof bolt threaded into the first end of the body.

6. The torque nut of claim 1, wherein the selected ones of the internal threads extend from the first major surface, to the second major surface, of the insert.

7. The torque nut of claim 6, wherein a surface of the insert has a mark from sprue as is characteristic of injection-molded parts and the insert is securely mounted in the passageway.

8. A torque nut, comprising:
- a body having a first end and an opposite second end, and a threaded interior passageway connecting the first and second ends of the body;
- an injection-molded breakaway insert in the passageway, with periphery of the insert engaging apexes of selected ones of the internal threads,
- wherein portions of the periphery of the insert are between adjacent threads and spaced from the nadir of the adjacent threads, and a layer of a material selected from the group of a non-friction material, a low friction material, and combinations thereof is between the threads and selected surface portions of the insert engaged by the threads.

9. A torque nut, comprising:
- a body having a flanged first end and an opposite second end, and a threaded interior passageway connecting the first and second ends of the body, and
- an injection-molded breakaway insert in the passageway, with periphery of the insert engaging apexes of selected ones of the internal threads wherein the insert is spaced from the flanged first end of the body and the second end of the body, and the insert has a first surface facing the flanged first end of the body and a second surface facing the second end of the body, wherein the first surface of the insert has a shape selected from the group of a convex surface, a rounded convex surface, a cone-shaped convex surface, a flat surface, and combinations thereof, and the second surface of the insert has a shape selected from the group of a concave surface, a rounded concave surface, a cone-shaped concave surface, a flat surface and combinations thereof;
- wherein portions of the periphery of the insert are between adjacent threads and spaced from the nadir of the adjacent threads and a layer of a material selected from the group of a non-friction material, a low friction material, and combinations thereof is between the threads and selected surface portions of the insert engaged by the threads.

* * * * *